ELECTRICAL EQUIPMENT COMPONENT MOUNTING

Filed May 2, 1952 2 Sheets-Sheet 1

INVENTOR
Anthony J. Balanda
BY Jewett, Mead, Browne & Schuyler
ATTORNEYS

Feb. 21, 1956 A. J. BALANDA 2,735,965

ELECTRICAL EQUIPMENT COMPONENT MOUNTING

Filed May 2, 1952 2 Sheets-Sheet 2

INVENTOR

Anthony J. Balanda

BY Jewett, Mead, Browne & Schuyler

ATTORNEYS

United States Patent Office 2,735,965
Patented Feb. 21, 1956

2,735,965

ELECTRICAL EQUIPMENT COMPONENT MOUNTING

Anthony J. Balanda, Waterbury, Conn., assignor to The Bristol Company, Waterbury, Conn., a corporation of Connecticut Application May 2, 1952, Serial No. 285,827

11 Claims. (Cl. 317—101)

This invention relates to a mounting for facilitating installation and removal of equipment components, and more particularly relates to a mounting of this type which includes an improved quick-acting latch mechanism for rapidly installing, locking and/or removing a component-bearing assembly which, for example, may be carried by a frame section or other member of an installation.

Equipment mountings have been employed heretofore to fasten components on an installation frame or to operatively associate components with other pieces of apparatus. Such mountings, however, often merely comprise the component and a simple screw-type clamp for mechanically securing the component in place. When the component and the support thus secured are provided with external terminals or the like communicating respectively with the component itself and with an external system, the prior art mounting devices fail to provide positive, quick-acting means for simultaneously installing the component-bearing assembly on the frame and for bringing the respective terminals into communication to establish a connection between the assembly and the system.

It is usually necessary, in the installation of conventional removable components, to manually position the component on a support and bring the terminals thereof into alignment with terminals of the external system in order to establish proper connection. Removable components are frequently mounted in locations where access is limited and careful positioning and alignment are therefore extremely difficult to accomplish; likewise, if the component is a part of an aircraft or vehicle control system, oftentimes it is necessary to mount such component during flight of the aircraft or movement of the vehicle at which time the support is unsteady and the component is otherwise difficult to install or remove. Any sudden jarrring movement of the support which might occur while mounting the component or removing it under these conditions may bend or break frail terminals or jam the clamping mechanism. Above and beyond the foregoing, such conventional arrangements usually fail to provide a positive, quick-acting, simple and foolproof mounting, easily operable even under most favorable conditions such as those encountered, for example, when the support is relatively steady and the location of the component is readily accessible.

It is an object of the present invention, therefore, to provide an improved mounting assembly for securing a separable equipment component to a support. Moreover, it is an object of the present invention to provide positive, quick-acting means for installing, securing and/or removing such a component on and/or from its support.

An important object of the present invention is to provide an improved means for bringing the terminals or the like carried by the component into communication with corresponding terminals or the like connected with an external system.

Another important object of the present invention is to provide an equipment mounting having latch means for quickly bringing into engagement terminals carried both by the component bearing assembly and the support, said means also being employed for securing the component to the support; for quickly disengaging the terminals, and for quickly removing the component from the support.

A further object of the present invention is to provide a quick-disconnect latch mechanism for rapidly and efficiently disconnecting communicating terminal means carried by the support and the component bearing assembly.

A still further object of the present invention is to provide an improved electrical connect-disconnect device for electrical system components.

In attaining these and other objects with the present invention there is provided a support which is adapted to be fastened to a section of an installation frame, and a component-bearing assembly adapted to be carried by the aforementioned support. A further feature provides a disconnect mechanism cooperatively arranged with the latching mechanism to forcibly shift the assembly relative to the support thereby to axially disengage the terminal means.

Other objects and features will be apparent from the following description and accompanying drawings of an illustrative embodiment of the invention wherein.

Figures 1, 2, 3, 10:
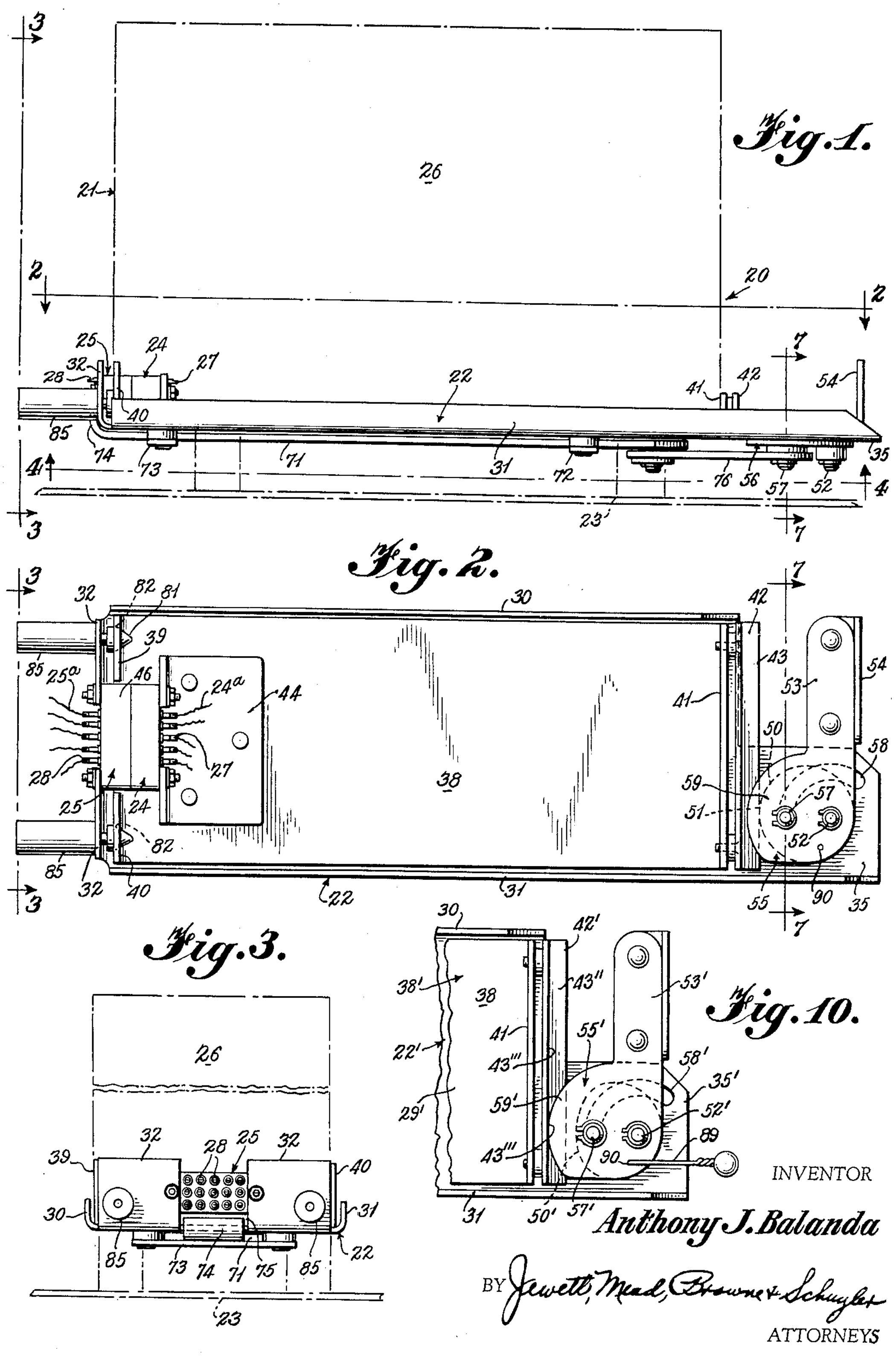
Fig. 1 is a side elevation of a mounting embodying the present invention.
Fig. 2 is a plan of the embodiment of the invention illustrated in Fig. 1 as viewed along line 2—2 thereof.
Fig. 3 is an end elevation of the embodiment of the invention illustrated in Fig. 1 as seen from line 3—3 of Fig. 2.
Fig. 10 is a detail view of a modification of a portion of the latching mechanism of this invention.

In the embodiment of the invention illustrated in Fig. 1, a mounting unit 20 including a separable and quickly removable electrical equipment component-bearing assembly 21 and a support 22 therefor are associated with an installation frame 23. Component-bearing assembly 21 is adapted and formed to be quickly removable from the support 22 in the manner described hereinafter.

Connecting means, which, in the illustrated embodiment comprise male and female connector blocks 24 and 25 respectively, are provided to establish electrical communication between an electrical component 26 of assembly 21 and an external system through lead wires 24*a*, male connector block 24, female connector block 25 and lead wires 25*a*. With electrical terminal means of the type shown leads 24*a* and 25*a* are soldered, respectively to male connector elements 27 of male block 24, and connector elements 28 of female block 25, and thus are wired to the component and the external system.

Figures 5, 6, 7, 8:
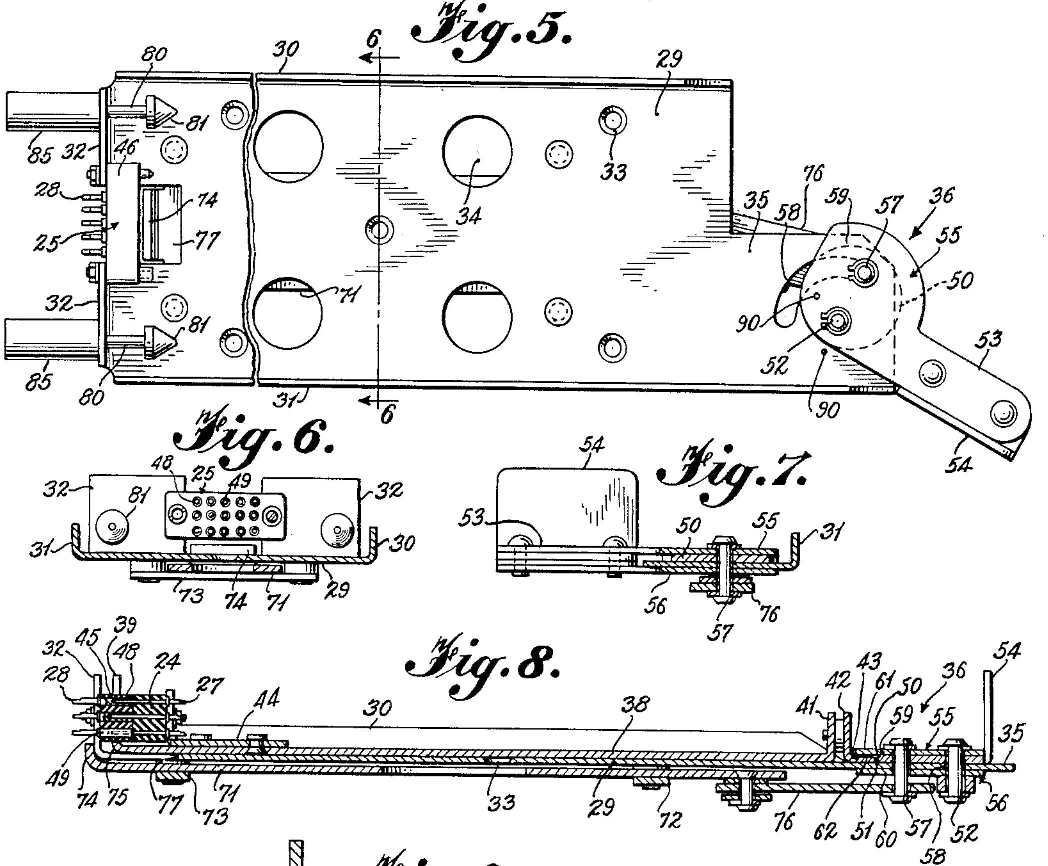
Fig. 5 is a plan view of the support portion of the embodiment of the mounting illustrated in Figs. 1, 2 and 4 and shows the latch means in unlocked position and with the component-bearing assembly removed.
Fig. 6 is a section taken along line 6—6 of Fig. 5 and illustrates electrical terminal means carried by the support.
Fig. 7 is a section taken along line 7—7 of Figs. 1 and 2 and shows in detail the construction of the operating lever of the latching mechanism.
Fig. 8 is a longitudinal section of the assembled mounting taken along line 8—8 of Fig. 4.

Referring to Figs. 5 and 6, support 22 comprises a channel shaped shelf-like member 29 with raised sides 30 and 31 and vertically projecting ears 32 formed by turning up spaced portions projecting from the inner or front end of member 29 transversely to raised sides 30 and 31. Openings 33 are formed in the member 29 to receive bolts or the like for fastening it to the installation frame; while portions may be cut out as at 34 to lighten the member 29. At the outer end of the member 29 a projecting leaf 35 provides a standard for the latching mechanism designated generally as 36.

The elements of component-bearing assembly 21 are secured to and supported by plate 38 constructed to be carried on the shelf member 29. Plate 38 is formed to fit snugly in the trough provided by raised sides 30 and 31 and is shiftable axially in the trough, relative lateral movement being prevented by the guide means presented by these raised sides. The inner or front end of plate 38 is notched and bent to provide vertically extending spaced wings 39 and 40 and the outer or rear end of plate 38 is bent to form a turned up strip 41. This strip 41 is utilized to support an L-shaped bar 42 one leg of which constitutes a horizontally and rearwardly extending flange 43. Plate 38, strip 41, bar 42, and flange 43, in a suitable modification of the illustrated embodiment, may be walls or parts of or attachment to a casing for electrical component 26.

Connector block 24 is supported on plate 38 by a bracket 44 with the male terminal lugs 45 projecting forwardly between the wings 39, 40 which are spaced sufficiently to accommodate body portion 46 of the mating female connector block 25. Ears 32 are utilized to carry the female connector block 25 on the support 22, the connector block 25 being bored longitudinally at 48 for receipt of tubular terminal sockets 49. In Fig. 8, connector pins 28 are shown of tubular construction, seated in sockets 48 and engaging terminal lugs 45 when the male and female elements of the connector block assembly are mated.

The connector elements 27 project outwardly from the connector block body portion 24 and may be wired to the component 26 by means such as lead wires 24*a*, while connector elements 28 projecting outwardly from the female connector block body portion 25 are adapted to be wired in an external system by means such as lead wires 25*a* or the like. Communication between the component 26 and an external system may be established by axially engaging male terminal lugs 45 and the terminal sockets 49 of female connector block 25.

Axial engagement of the terminal means, in the specific embodiment illustrated being male and female connector blocks 24, 25, is accomplished by shifting the plate 38 forwardly and axially in the trough of channel shaped support member 29.

In order to move the component-bearing assembly relative to the support and thereby automatically effect engagement of the terminal means, the present invention provides a latching cam 50 rotatably mounted on the leaf 35 of member 29. Linear shifting movement is imparted to the component-bearing assembly by cam 50 which bears at its perimeter on a cam follower edge portion 51 of flange 43. Upon counter-clockwise or "make" movement of the cam 50, the plate 38 and the supported equipment and terminal units are shifted forward whereby the male and female connector blocks 24, 25 are urged into terminal means engaged position.

Further particulars of the make mechanism are shown in Figs. 7 and 8 which are detail views of one form of a latching assembly which may be utilized to effect proper movement of the component-bearing assembly relative to the support. Cam 50 shown as a circular disc mounted offset on pivot 52, may be actuated by a means comprising lever 53 carrying a finger piece or "flag" 54 providing a manipulation facilitating handle. Lever 53 comprises a pair of similarly shaped spaced blades 55 and 56 arranged to embrace both the leaf 35 and cam 50 and clamped together and to cam 50 by a coupling pin 57 passing through a curved slot 58 provided in the leaf 35.

Body portions 59, 60 of blades 55, 56 are represented for simplicity partially of circular outline, however, as will be apparent from the description to follow other shapes may be adopted. As seen in Fig. 8, when lever 53 is displaced about the pivot 52 to the extreme counterclockwise or "make" position, with the coupling pin 57 abutting against the end of the curved slot 58, the overhang 61 of body portion 59 constitutes a positive locking means or catch for effecting latching engagement with flange 43. To disengage the catch it is simply necessary to displace the lever 53 clockwise sufficiently to slide the overhang 61 from contact with the keeper portion 62, which in the construction shown is accomplished by movement of the lever 53 through approximately ⅞ of the total travel permitted by curved slot 58.

Coupling pin 57 is also utilized to connect lever 53 and blades 55, 56 to a combination terminal locking means and disconnect mechanism which comprises a toggle arrangement including an elongated member 71 slidably retained below support 29 by straps 72, 73. The free end of elongated member 71 is bent up to form a vertically extending hook 74 for engagement with the component-bearing assembly at 75, while the opposite end is connected to blade 56 of the latching assembly by means of coupling pin 57 and link 76.

Figure 4:
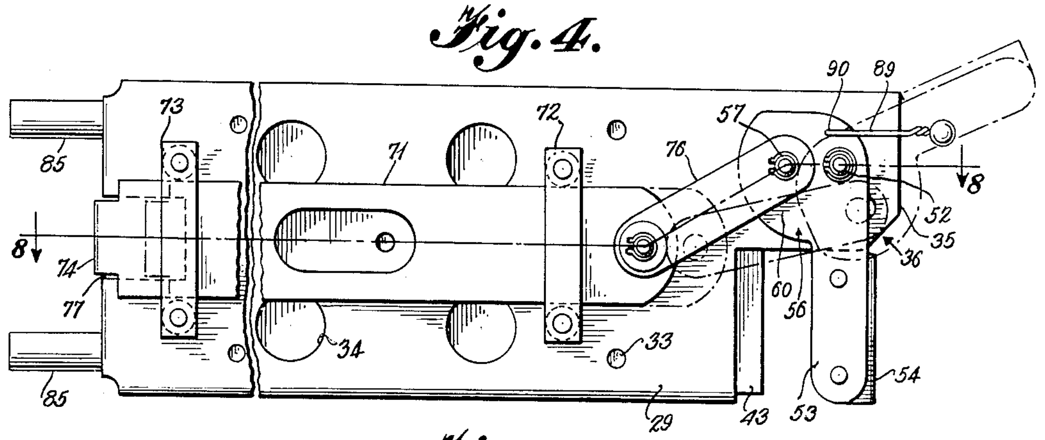
Fig. 4 is a bottom view of the embodiment of the support embodied in the present invention as shown in Fig. 2 as seen from line 4—4 of Fig. 1, more clearly illustrating portions of the latching means of the present invention.

It will be seen that the system comprising the slidably mounted elongated member 71, the link 76 and the latching mechanism 36 together form an over center toggle arrangement which resists movement of the component-bearing assembly out of its locked position. When the operating lever 53 is in the full-line position shown in Fig. 4, for example, corresponding to the locked position of the component-bearing assembly, it will be noted that the point of pivotal connection 57 between link 76 and latching mechanism 36 is over center of the line defined by the pivot point 52 of the latching mechanism 36 and the point of pivotal connection between the link 76 and member 71. Before the component-bearing assembly can move out of its locked position in which connector blocks 24 and 25 are engaged, the pivot point 57 must move to an oppositely disposed over center position as shown in dotted outline in Fig. 4. Any vibrational forces tending to shift the component-bearing assembly 21 away from the position in which connector block 24 of the assembly 21 engages stationary connector block 25 also causes member 71 to shift in a direction which causes cam 56 to be moved in a locking direction. Thus, with reference to the view shown in Fig. 4, vibrational forces which tend to shift the component-bearing assembly 21 away from the terminal-engaged position on the stationary support 22 also cause the member 71 and link 76 to shift the cam 56 in a clockwise or locking direction to thereby oppose any unlocking effect which the vibrational forces might otherwise have.

A notch is cut in the front end of the member 29 below connector block 25 in order to provide a slot 77 permitting travel of hook 74. This hook 74 projects upwardly through the slot and engages abutting strip 75 of plate 38 when drawn to disconnect the component-bearing assembly. To operatively disconnect the component-bearing assembly from terminal means engaged position the lever 53 is displaced clockwise through the angle of movement necessary to disengage overhang 61 from contact with the keeper portion 62 and then through the remaining angle of movement necessary to engage hook 74 with strip 75 to shift the plate 38 along the troughed support 29.

Figure 9:
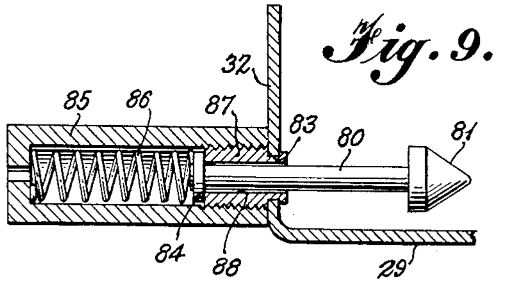
Fig. 9 is a detail view of the spring biased ejector means carried by the support.

Also carried by the support are spring biased ejector pins 80 (Fig. 9) with conical heads 81 which seat in openings 82 in wings 39, 40. These ejector pins 80 serve as an aid in forcibly separating the male and female connector blocks 24, 25 from engagement and, in addition, function as a further limiting apparatus confining the relative movement of the member 29 and the support 38 to along the axis of engagement of the terminal means when the member is shifted to connect or engage the terminals. The ejector pins 80 project from the ears 32 through openings 83 and carry at one end pistons 84 which ride in the cylindrical interior of casings 85 and bear against springs 86. Casings 85 are supported on the ears 32 by means of screw-threaded studs 87 which are bored longitudinally at 88 to provide a bearing for pins 80. If desired, pins 80 may be rigidly mounted stationary pins which function to align the terminal pins and sockets. In any event, the pins 80, whether spring-biased or stationary, should be of considerably stronger construction than the terminal pins which are aligned thereby.

In mounting the assembly of this invention the equipment bearing member, with the component attached and connected for communication with the connector block terminal means, is placed upon the shelf-like support (which may be fastened in any desired manner to an installation frame section) with the terminal means disengaged but positioned adjacent to each other and the latching mechanism in unlocked position (Fig. 5). To shift the assembly relative to the support whereby to engage or establish communication between the terminal means and conjointly clamp the component in place, the operating lever 53 of the latching mechanism is grasped by the finger piece 54 and moved counter-clockwise from the extreme position shown in Fig. 5 to the locked position shown in Fig. 2. Cam 50 operating against the edge 51 of flange 43, which functions as a cam follower, urges the plate and the component borne thereon along the shelf-like support and in this way effects communication between the terminal means. During such locking motion engagement of the lever 53, keeper 62 is latchably engaged by catch 59 of the latch mechanism to clamp or lock the equipment bearing member to the support. During relative movement of the support and the bearing member caused by cam 50, sides 30 and 31 of the member 29 serve as a guide and limit relative movement to along the axis of engagement of the terminal means. Spring biased ejector pins 80 with the conical heads 81 seated in openings 82 in wings 39 and 40 serve as an additional limiting apparatus confining the relative movement of the member and the support to along the axis of engagement of the terminal means.

As shown in Figs. 2 and 10, a sealing wire 89 may be inserted through aligned openings 90 in the spaced blades, cam and support elements respectively or the latching mechanism, thereby to securely hold the mechanism in locked position. With the sealing wire in place the actuating lever will be held fixedly positioned, however, upon forcible displacement of the lever in a clockwise direction the sealing wire may be sheared off, providing a safety device securely holding the assembly in locked position but permitting operation in an emergency.

A modification of the specific structure of the latching mechanism illustrated in Figs. 1–9 is also shown in Fig. 10. Rather than providing a separate cam and catch portion on the operating lever of the latching mechanism as has been previously described, it may be deemed desirable to employ a movable member 55′ capable of performing both functions in cooperation with an associated fixed cam follower and keeper member 42′. As illustrated, this may be accomplished by providing a shelf-like support 29′ with a cam follower and keeper member in the form of an L-shaped bar 42′ on the plate 38′, one leg 43″ of which bar constitutes a horizontally extending keeper portion for latching engagement with the flange 59′ of movable member 55′, the other vertically extending leg 43‴ of the bar constituting a cam follower bearing shoulder for cooperation with the camming periphery of flange 59′ of member 55′. Movable member 55′ has a substantially circular body portion mounted off-center on the leaf 35′ of support 22′ by means of pivot 52′ and a lever-like handle 53′ is provided for purposes of manipulating the movable member. A washer 50′ serves to space the body portion 59′ of member 55′ sufficiently above leaf 35′ to allow it to slide over the horizontally extending keeper portion 43″ of bar 42′. Arcuate slot 58′ permits coupling pin 57′ to pass through leaf 35′ to connect with any associated mechanism carried beneath the support 22′. When constituted as shown in Fig. 10, the latching assembly utilizes the camming action resulting from the periphery of body portion 59′ bearing against shoulder 43‴ during rotation of member 55′ to urge the assembly into terminal means engaged position, and the latching engagement effected when body portion 59′ overlies keeper 43″ during rotation of member 55′.

To remove the equipment component assembly from the support with either of the embodiments of the latching mechanism illustrated it is necessary to rotate the operating lever clockwise, thereby operating the disconnect mechanism which moves the member relative to the support to disengage the terminal means. The catch portion of the latching mechanism is displaced from engagement with the keeper on the member during clockwise rotation of the operating lever and the equipment component bearing assembly with the component attached may then be lifted from the support.

Modifications of the embodiment of this invention illustrated herein will be obvious to those skilled in the art and may be effected without departing from the spirit of the invention, it being intended that the patent shall cover by suitable expression in the appended claims all features of patentable novelty shown and/or described herein.

It will be understood that the present invention may be used in connection with fluid systems as well as electrical systems and accordinly the nomenclature used herein is not to be restricted to the application of the invention to electrical arts.

I claim:

1. A mounting for removably installing equipment components on an installation frame comprising: a support; a component-bearing assembly; said support having guide means to constrain said assembly to motion in a straight-line path; first connection means carried by said support for communication with an external system; second connection means carried by said assembly for communication with the first connection means and with a component; and make-break mechanism for said connection means including, a cam pivotally mounted on said support, a cam follower carried by said assembly, a disconnect arm linked to said cam and engageable with the assembly, and cam actuating means operating said cam on make movement to urge the connection means into communication and on break movement to engage the disconnect arm with the assembly and withdraw the connection means from communication.

2. A mounting for removably installing equipment components on an installation frame comprising: a support; a component-bearing assembly; said support having guide means to constrain said assembly to motion in a straight-line path; first connection means carried by said support for communication with an external system; second connection means carried by said assembly for communication with the first connection means and with a component; and make-break mechanism for said connection means including, a support carried cam, a cam follower and keeper mounted on said assembly, a catch carried by said cam for latching engagement with said keeper, a disconnect arm linked to said cam and carried by the support for engagement with the assembly, and cam actuating means operating said cam on make movement to conjointly shift the assembly relative to the support and engage the catch, whereby to urge the connection means into communication, and on break movement to conjointly disengage the catch and operate the arm to shift the assembly relative to the support, whereby to withdraw the connection means from communication.

3. A mounting for removably installing equipment components on an installation frame comprising: a support; a component-bearing assembly; said support having guide means to constrain said assembly to motion in a straight-line path; first connection means carried by said support for communication with an external system; second connection means carried by said assembly for communication axially with said first connection means and with a component; guide means cooperatively carried by said support and said assembly to limit relative lateral movement along the axis of communication of said connection means; and make-break mechanism for said connection means including a cam pivotally mounted on said support, a cam follower and keeper carried by said assembly, a catch carried by said cam for latching engagement with the keeper, a disconnect arm linked to said cam and engageable with the assembly, and cam actuating means operating said cam on make movement to conjointly shift the assembly relative to the support and engage the catch, whereby to urge the connection means into communication, and on break movement to conjointly disengage the catch and operate the disconnect arm to shift the assembly relative to the support, whereby to withdraw the connection means from communication.

4. In an electrical installation, a mounting for removably installing equipment components comprising: a troughed shelf for fastening to a section of an installation frame, a component-bearing base plate riding in the troughed shelf, male and female electrical connections carried by said shelf and said base plate and engageable to provide electrical communication between said shelf and an electrical component carried by said base plate, and make-break mechanism for said connections including a shelf carried cam, a cam follower carried by the base plate, a disconnect arm linked to said cam and engageable with the base plate, and cam actuating means operating said cam on make movement to contact the cam follower and shift the base plate along the trough, whereby the male and female connections are mated, and on break movement to operate the disconnect arm to engage and shift the base plate along the trough, whereby to withdraw the male and female electrical connections from communication.

5. A mounting for quickly removable equipment components comprising a support, a component-bearing assembly slidably movable axially on said support, a first connecting means carried by said support for establishing communication between a component of said assembly and an external system, a second connecting means carried by said assembly and adapted to communicate with said first connecting means and said component, guide means carried by said support to prevent lateral movement of said assembly, an operating member pivotally movable about a fixed pivot point on said support, a cam element carried by said operating member for slidably moving said assembly axially on said support to effect engagement of said first and second connecting means with each other, cam follower means carried by said assembly for engagement with said cam element, an elongated member supported for sliding linear movement adjacent said support, a releasing member carried by said elongated member and engageable with said assembly to effect disengagement of said first and second connecting means, and link means connecting said elongated member to said operating member, one end of said link means being pivotally connected to an end of said elongated member, the opposite end of said link means being pivotally connected to said operating member, said link means and said operating member forming an over center toggle tending to maintain said first and second connecting means in connected relation.

6. A mounting for quickly removable equipment components comprising a support, a component bearing assembly slidably movable axially on said support, connecting means respectively carried by said support and said assembly for mating engagement with each other to establish communication between said support and said assembly, guide means carried by said support to prevent lateral movement of said assembly, an operating member pivotally movable about a fixed pivot point on said support, a cam element carried by said operating member for slidably moving said assembly along said support to effect engagement of said connecting means, cam follower means carried by said assembly for engagement with said cam element, a toggle link member, one end of said toggle link member being pivotally connected to said operating member, the opposite end of said link member being pivoted about a linearly movable pivot point, the point of pivotal connection of said toggle link to said operating member being movable over center of the line defined by said pivot point of said operating member and said linearly movable pivot point when said connecting means move from an engaged to a disengaged position.

7. A mounting for quickly removable equipment components comprising a support, a component-bearing assembly slidably movable axially on said support, connecting means respectively carried by said support and said assembly for mating engagement with each other to establish communication between said support and said assembly, guide means carried by said support to prevent lateral movement of said assembly, an operating member pivotally movable about a fixed pivot point on said support, a cam element carried by said operating member for slidably moving said assembly axially in a straight line along said support to effect engagement of said connecting means, cam follower means carried by said assembly for engagement with said cam element, an elongated member constrained to linear movement adjacent said support, a releasing member carried by an outer extremity of said elongated member to effect sliding movement of said assembly to disengage said connecting means, and a toggle link pivotally connected at one of its ends to an end of said elongated member and at the other of its ends to said operating member, said point of pivotal connection of said toggle link to said operating member having an over center position corresponding to the engaged position of said connecting means and an oppositely-disposed over center position corresponding to the disengaged position of said connecting means.

8. A mounting for quickly removable equipment components comprising a support, a component-carrying assembly slidably movable on said support, connecting means respectively carried by said support and said assembly for mating engagement with each other to establish communication between said support and said assembly, guide means carried by said support to prevent lateral movement of said assembly, an operating member pivotally mounted on said support, a cam element carried by said operating member, a cam follower surface on said assembly adapted to engage said cam element, said operating member being angularly movable to an extreme position in which said connecting means of said support and said assembly are in engagement with each other due to the operation of said cam on said cam follower, said operating member being movable to an opposite extreme position in which said respective connecting means are disengaged from each other, a releasing member adapted to engage said assembly to effect disengagement of said connecting means, and toggle link means connecting said releasing member to said operating member, said toggle link means having a different over center position corresponding to each of the two extreme positions of said operating member.

9. A mounting as defined in claim 8 in which said assembly carries a flange portion and said operating member carries a latch portion adapted to overlie said flange portion when said operating member is approaching and has reached said extreme position whereby to restrain said assembly from movement in a plane perpendicular to the supporting surface for said assembly.

10. A mounting for quickly removable equipment components comprising a support, a component bearing assembly slidably movable axially on said support, connecting means respectively carried by said support and said assembly for mating engagement with each other to establish communication between said support and said assembly, guide means carried by said support to prevent lateral movement of said assembly, an operating member pivotally movable about a fixed first pivot point on said support, a cam element carried by said operating member, a cam follower surface on said assembly adapted to engage said cam element to thereby impart linear sliding movement to said assembly, said operating member being movable to an extreme position in which said connecting means of said support and said assembly are engaged, and to an opposite extreme position in which said connecting means are disengaged, an elongated member supported for linear movement beneath said support, a hook-like releasing member carried by said elongated member and adapted to engage said assembly and to impart linear sliding movement thereto whereby said connecting means are disengaged, a toggle link member, one end of said toggle link member being pivotally connected at a second pivot point to an end of said elongated member, an opposite end of said toggle link member being pivotally connected at a third pivot point to said operating member, said third pivot point moving over center of the line defined by said first and second pivot points during movement of said operating member from said extreme position to said opposite extreme position.

11. A mounting as defined in claim 8, in which said operating member is provided with a camming portion engageable with a cam follower surface of said component bearing assembly, said operating member also being provided with a latching portion adapted to overlie a surface of said assembly when said connecting means of said support and of said assembly are in engagement.

References Cited in the file of this patent

UNITED STATES PATENTS

| | | |
|---|---|---|
| 586,029 | Hall | July 6, 1897 |
| 1,579,559 | Moll | Apr. 6, 1926 |
| 2,488,372 | Breisch | Nov. 15, 1949 |
| 2,514,246 | Knox | July 4, 1950 |
| 2,594,748 | Earl | Apr. 29, 1952 |